(12) United States Patent
Grobecker et al.

(10) Patent No.: US 10,476,053 B2
(45) Date of Patent: Nov. 12, 2019

(54) BATTERY DOOR ASSEMBLY FOR A BATTERY COMPARTMENT WITHIN A NIGHT VISION DEVICE

(71) Applicant: BAE SYSTEMS INFORMATION AND ELECTRONIC SYSTEMS INTEGRATION INC., Nashua, NH (US)

(72) Inventors: Michael J. Grobecker, Merrimack, NH (US); Kenneth D. Cleveland, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 252 days.

(21) Appl. No.: 15/815,461

(22) Filed: Nov. 16, 2017

(65) Prior Publication Data
US 2019/0148686 A1    May 16, 2019

(51) Int. Cl.
| | |
|---|---|
| *H01M 2/10* | (2006.01) |
| *H04N 5/225* | (2006.01) |
| *E05C 19/06* | (2006.01) |
| *H04M 1/02* | (2006.01) |
| *H04N 5/33* | (2006.01) |

(52) U.S. Cl.
CPC ........... *H01M 2/1055* (2013.01); *E05C 19/06* (2013.01); *H01M 2/1066* (2013.01); *H04M 1/0262* (2013.01); *H04N 5/2252* (2013.01); *H04N 5/33* (2013.01)

(58) Field of Classification Search
CPC ..... H01M 2/1055; H04N 5/2252; E05C 19/06
See application file for complete search history.

(56) References Cited

U.S. PATENT DOCUMENTS

| | | |
|---|---|---|
| 5,372,395 A | 12/1994 | Yang |
| 5,600,139 A | 2/1997 | Mladjan et al. |
| 5,634,675 A | 6/1997 | Mo |
| 5,848,719 A | 12/1998 | Goldenberg |
| 9,476,676 B1 | 10/2016 | Greenslade et al. |
| 2006/0188249 A1 | 8/2006 | Noguchi |
| 2007/0205208 A1 | 9/2007 | Ueda |
| 2012/0113503 A1 | 5/2012 | Grasheim et al. |
| 2012/0114983 A1 | 5/2012 | Stokes et al. |
| 2016/0143166 A1* | 5/2016 | Masuda .................... E05C 1/10 312/326 |
| 2017/0176139 A1 | 6/2017 | Zhang et al. |

OTHER PUBLICATIONS

International Search Report, PCT/US18/61025,7 pages, dated Feb. 11, 2019.

* cited by examiner

*Primary Examiner* — Stephan J Essex
(74) *Attorney, Agent, or Firm* — Antony P. Ng; Russell Ng PLLC; Scott J. Asmus

(57) ABSTRACT

A battery door assembly for a battery compartment is disclosed. The battery door assembly includes a battery cover, glide track, a spring-loaded button, a locking tab and a plurality of hinges. The plurality of hinges is pivotally connected to a chassis of a scope. The locking tab keeps the battery cover from opening. The battery cover can be unlocked by first applying pressure on the spring-loaded button, and then sliding the spring-loaded button and the locking tab from one end of the glide track to another end of the glide track while maintaining the applied pressure on the spring-loaded button.

19 Claims, 7 Drawing Sheets

BATTERY DOOR ASSEMBLY FOR A BATTERY COMPARTMENT WITHIN A NIGHT VISION DEVICE

TECHNICAL FIELD

The present disclosure relates to battery door assemblies in general, and in particular to a battery door assembly for a battery compartment within a night vision device.

BACKGROUND

Night vision devices, also known as image enhancement devices, are optical instruments that allow images to be produced in very low light levels to the point of approaching total darkness. Night vision devices typically include image intensifier tubes and various optics that convert infrared and near infrared light into viewable images. Night vision devices are commonly used by military personnel for conducting operations in low-light conditions.

Night vision devices can be divided into three broad categories, namely, scopes, goggles and cameras. Scopes, which can be hand-held or mounted on a weapon, are typically monocular having one eye-piece. Goggles, which can be hand-held or worn on the head, are typically binoculars having two eye-pieces and can be integrated with a helmet. Cameras are often permanently mounted on wherever night vision is desired, including buildings and/or properties.

From a practical standpoint, night vision devices are typically designed to be operated by batteries. As such, night vision devices have to be equipped with a battery compartment for holding one or more batteries, and the battery compartment typically comes with a battery door with a latch to keep the battery door from accidentally opening. A majority of battery door latches designed for military applications must meet certain requirements, such as small, light weight, low cost, etc.

The present disclosure provides an improved battery door assembly for night vision scopes.

SUMMARY

In accordance with one embodiment of the present disclosure, a battery door assembly includes a battery cover, glide track, a spring-loaded button, a locking tab and a set of hinges. The set of hinges is pivotally connected to a chassis of a scope. The locking tab keeps the battery cover from opening. The battery cover can be unlocked by first applying pressure on the spring-loaded button, and then sliding the spring-loaded button and the locking tab from one end of the glide track to another end of the glide track while maintaining the applied pressure on the spring-loaded button.

The features and advantages described herein are not all-inclusive and, in particular, many additional features and advantages will be apparent to one of ordinary skill in the art in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein.

DETAILED DESCRIPTION

Figure 1:
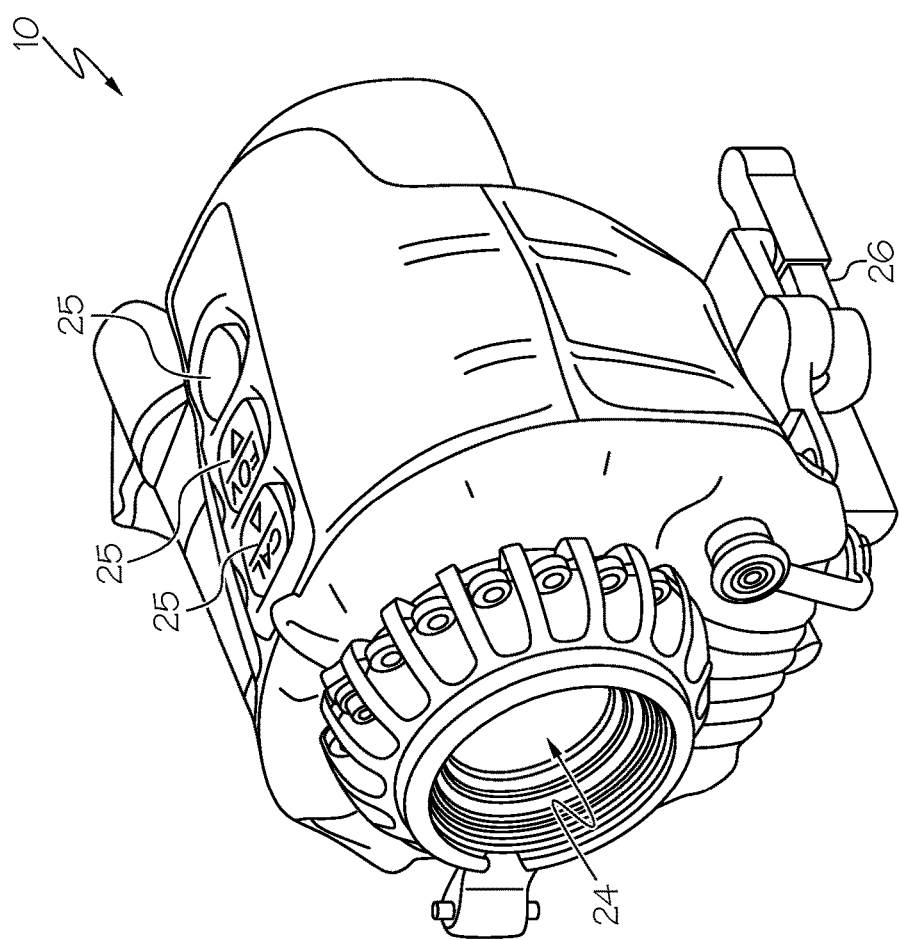
FIG. 1 is an isometric view of a night vision scope in which a battery door assembly, according to one embodiment of the present disclosure, can be incorporated.

Referring now to the drawings and in particular to FIG. 1, there is illustrated an isometric view of a night vision scope in which a battery door assembly, according to one embodiment of the present disclosure, can be incorporated. As shown, a night vision scope 10 includes a lens 24, multiple control buttons 25 and a clamping mechanism 26. Lens 24 is for receiving light signals. Control buttons 25 are for controlling various viewing functions such as field-of-view, focus, etc. Clamping mechanism 26 is for mounting night vision device 10 onto a rail system of a firearm (not shown). Common rail systems include a Picatinny rail system and a Weaver rail system.

Figure 2:
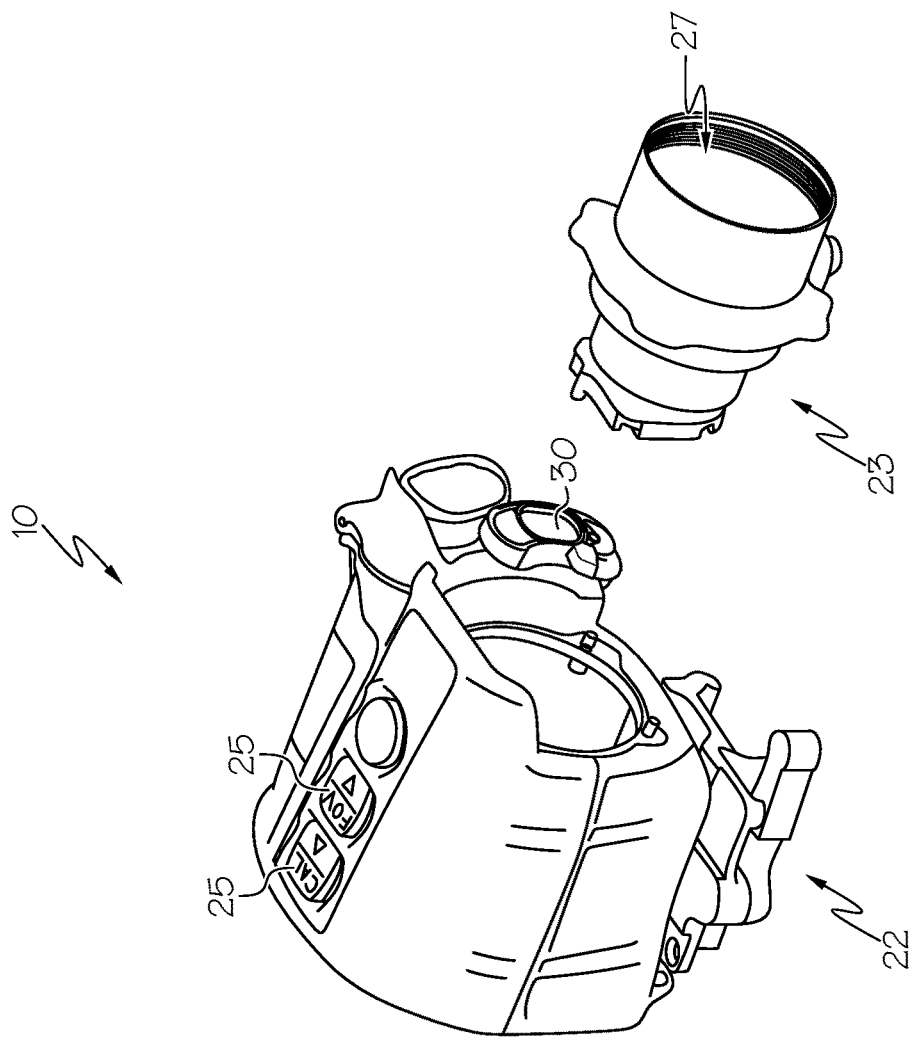
FIG. 2 is an exploded view of the night vision scope from FIG. 1.
Figure 2:
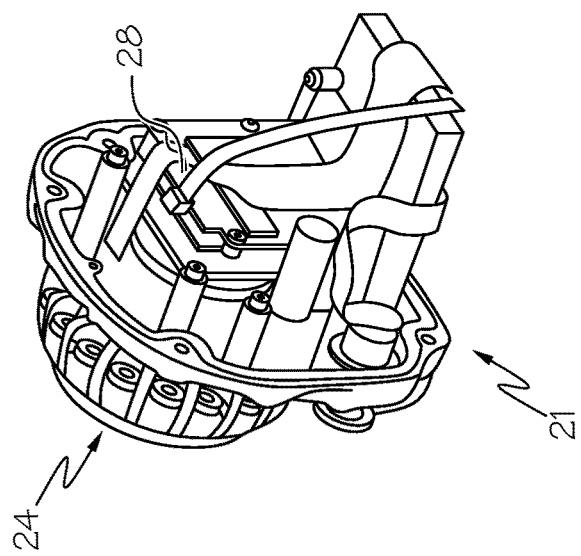

With reference now to FIG. 2, there is illustrated an exploded view of night vision scope 10, according to one embodiment. As shown, night vision scope 10 includes a front-end optical module 21, a control module 22 and a back-end optical module 23. Front-end optical module 21 includes lens 24, an image sensor device 28 and various electronic components. Control buttons 25 for controlling the various electronic components are located on control module 22. Control module 22 also includes a battery door assembly 30 along with a battery compartment (not shown) for storing batteries that are essential for the normal operations of night vision scope 10. Back-end optical module 23 includes an eye piece 27.

Figure 3A:
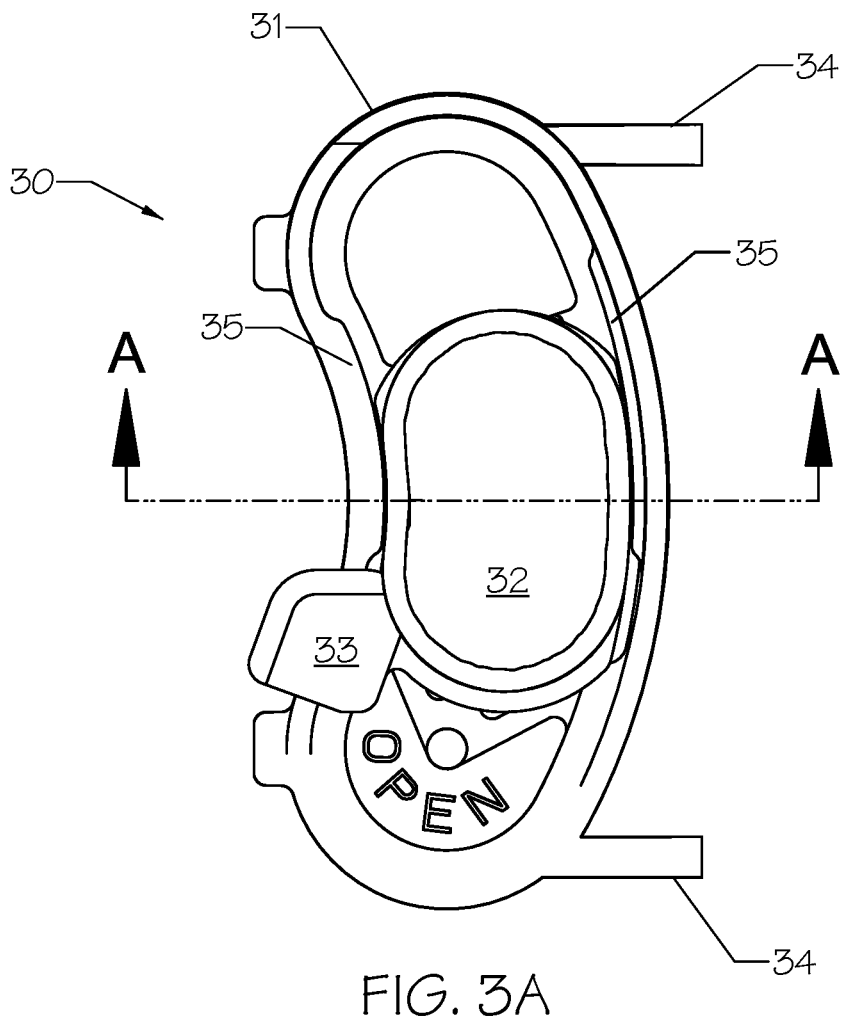
FIG. 3A is a top view of a battery door assembly on the night vision scope from FIG. 1, according to one embodiment.

Referring now to FIG. 3A, there is illustrated a top view of battery door assembly 30 for the battery compartment located on control module 22 (from FIG. 2), according to one embodiment. As shown in FIG. 3A, a battery door assembly 30 includes a battery cover 31, a spring-loaded button 32, and a locking tab 33. Battery cover 31 includes a pair of hinges 34 and a curved glide track (path) 35. Battery cover 31 is pivotally connected to the chassis of control module 22 via hinges 34. Curved glide track 35 is made up of the inside vertical surface of battery cover 31. The curvature of curved glide track 35 is approximately 20° radian in one example. Spring-loaded button 32 and locking tab 33 rest within curved glide track 35. Batteries, which supply electrical power to the electronics of control module 22, are located inside the battery compartment (not shown) directly underneath battery cover 31.

Figure 3B:
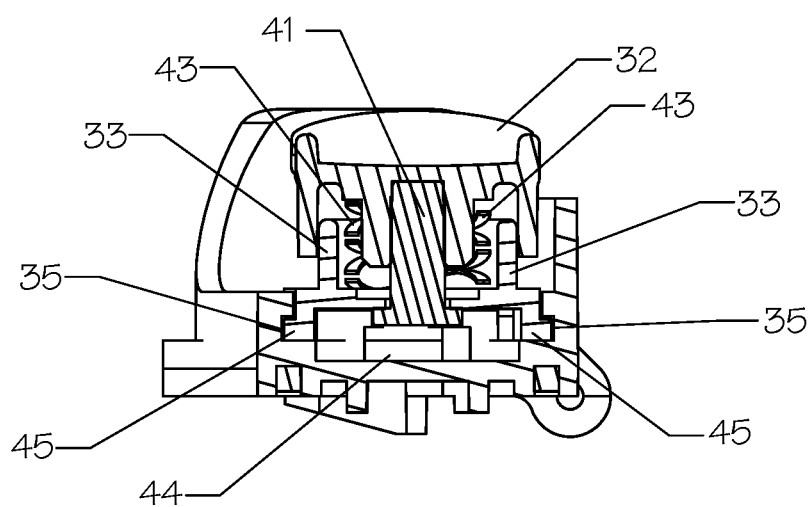
FIG. 3B is a cross-section view of the battery door assembly from FIG. 3A, according to one embodiment.

Referring now to FIG. 3B, there is illustrated a cross-section view of battery door assembly 30 in FIG. 3A along lines A-A, according to one embodiment. As shown, spring-loaded button 32 is connected to a T-shaped pressed-in insert 41 having a head wider than its body. Spring-loaded button 32 is also slidably connected to locking tab 33 via a spring 43 such as a wave spring. Locking tab 33 includes latch feet 45 that engage glide track 35 located on the inside vertical surface of battery cover 31, which keep spring-loaded button 32 and locking tab 33 attached to battery cover 31 at all times. The shape of latch feet 45 are such that they follow the radius of glide track 35 in order to provide consistent engagement with battery cover 31. The head of pressed-in insert 41 is shown to be located on top of a locking channel 44.

Figure 4A:
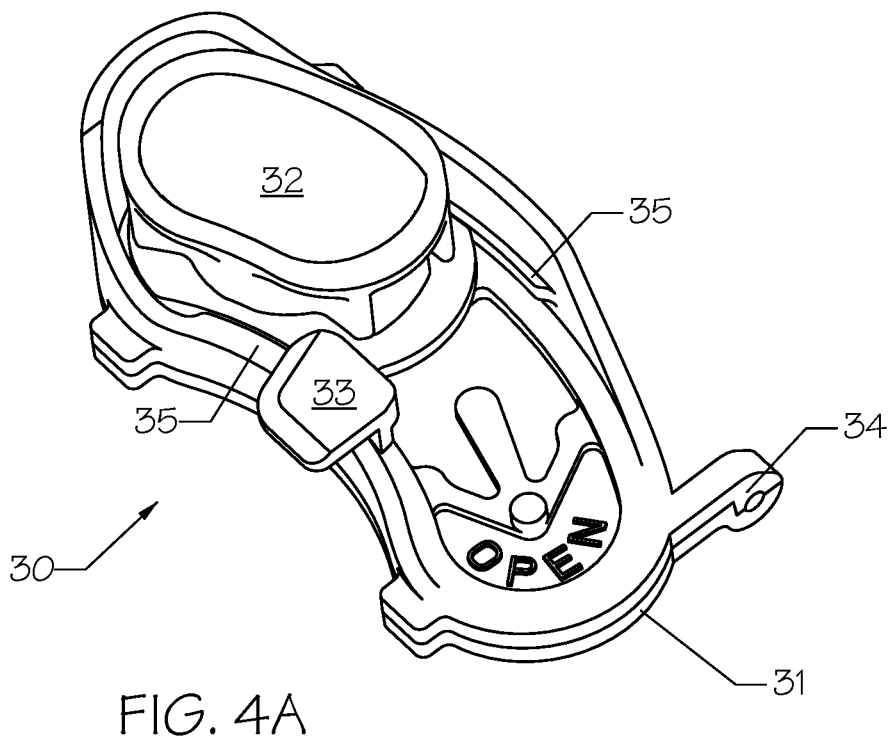
FIGS. 4A-4B are isometric views of the battery door assembly from FIG. 3A, according to one embodiment.
Figure 4B:
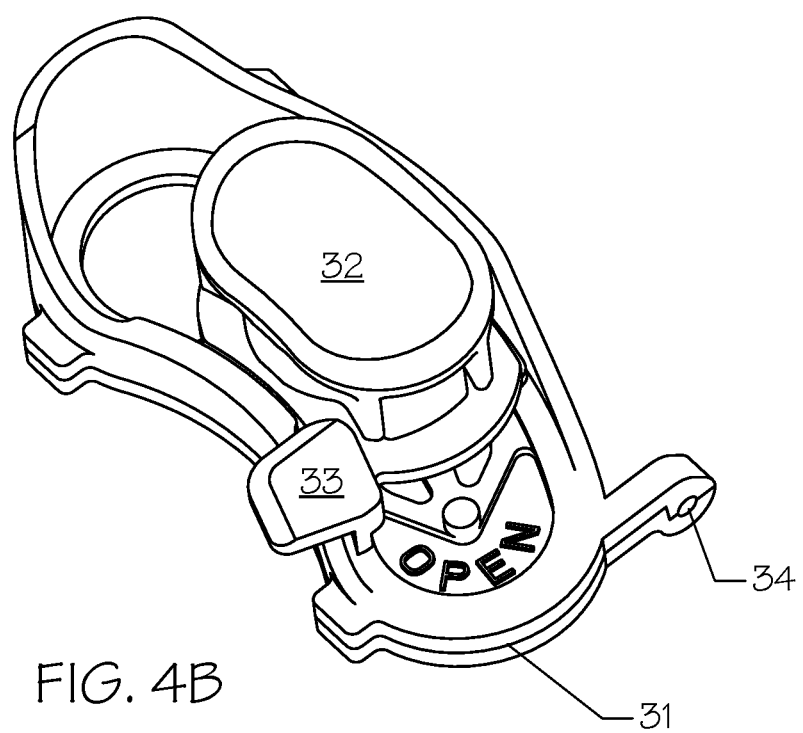

With reference now to FIGS. 4A-4B, there are illustrated two isometric views of battery door assembly 30, according to one embodiment. In FIG. 4A, battery door assembly 30 is shown to be in a closed and locked position. In this closed and locked position, spring-loaded button 32 and locking tab 33 are prevented from moving towards the other end of glide track 35 (with word OPEN). In addition, locking tab 33 engages a slot or tab (not shown) located on control module 22 to prevent battery cover 31 from flipping open. In order to unlock battery cover 31, an operator may apply pressure (push) on spring-loaded button 32 via a thumb or finger, and then slides spring-loaded button 32 and locking tab 33 towards the other end of glide track 35 while maintaining pressure on spring-loaded button 32. The applied pressure for operating spring-loaded button 32 is, in one example, approximately 4 pounds. After spring-loaded button 32 and locking tab 33 have been placed at the other end of glide track 35, battery cover 31 is in an unlocked position, as shown in FIG. 4B, such that locking tab 33 is clear of the slot or tab located on control module 22, allowing the operator to flip open battery cover 31 in order to install or replace batteries located inside the battery compartment (not shown).

Figure 5A:
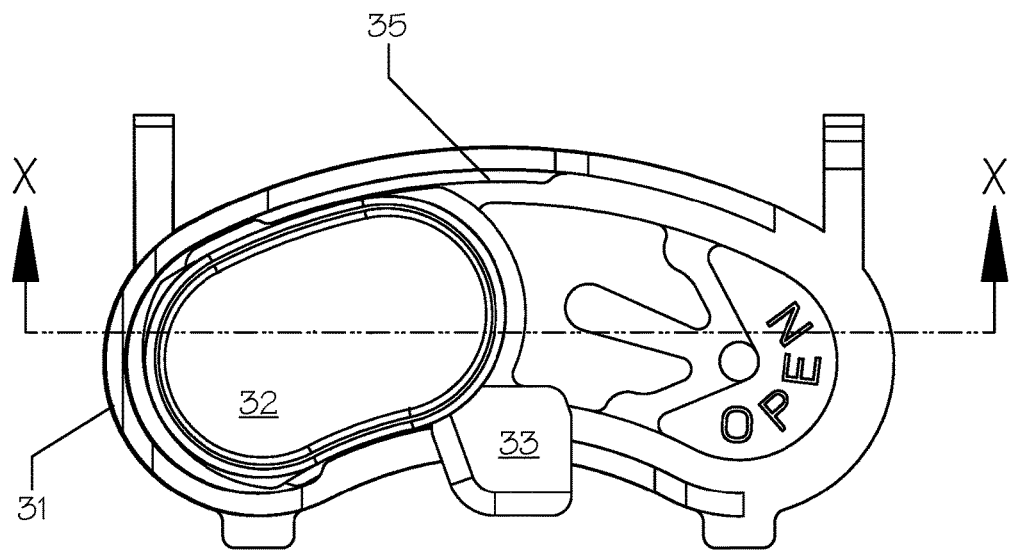
FIGS. 5A-5C are top views of the battery door assembly from FIG. 3A having a spring-loaded button at various locations.
Figure 6A:
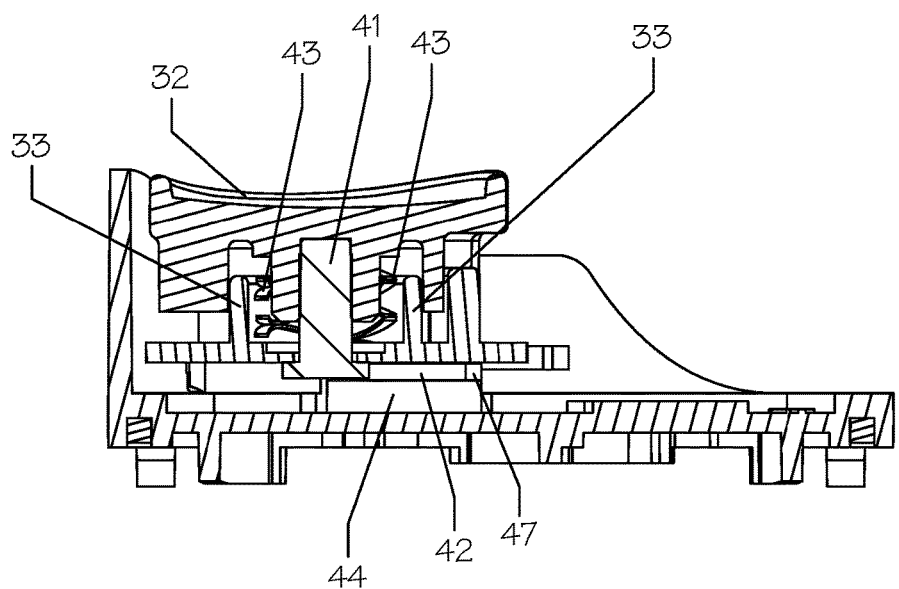
FIGS. 6A-6C are cross-section views of the battery door assembly from FIGS. 5A-5C, respectively.
Figure 5B:
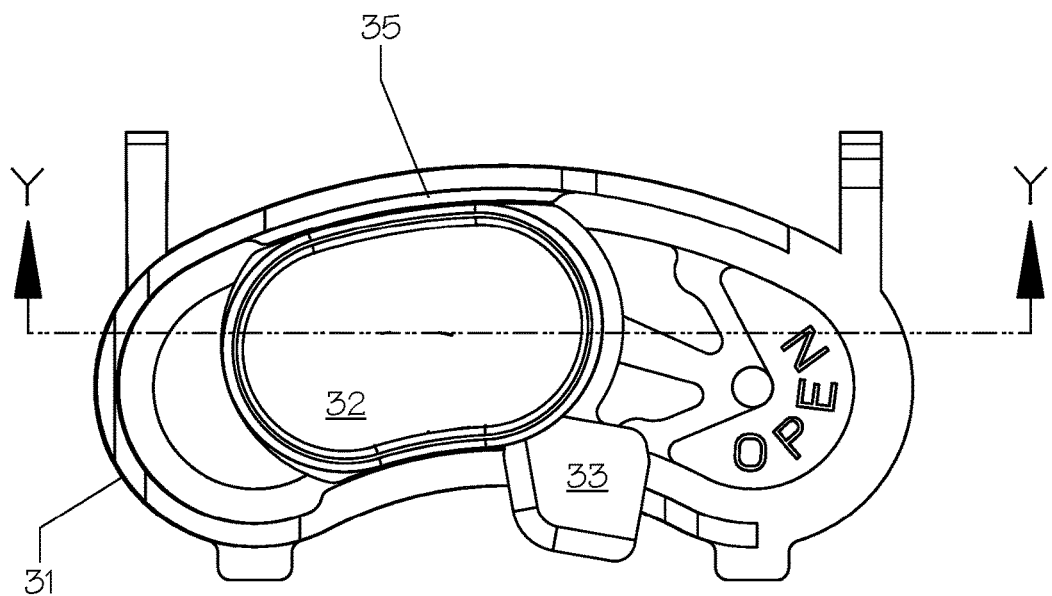
Figure 6B:
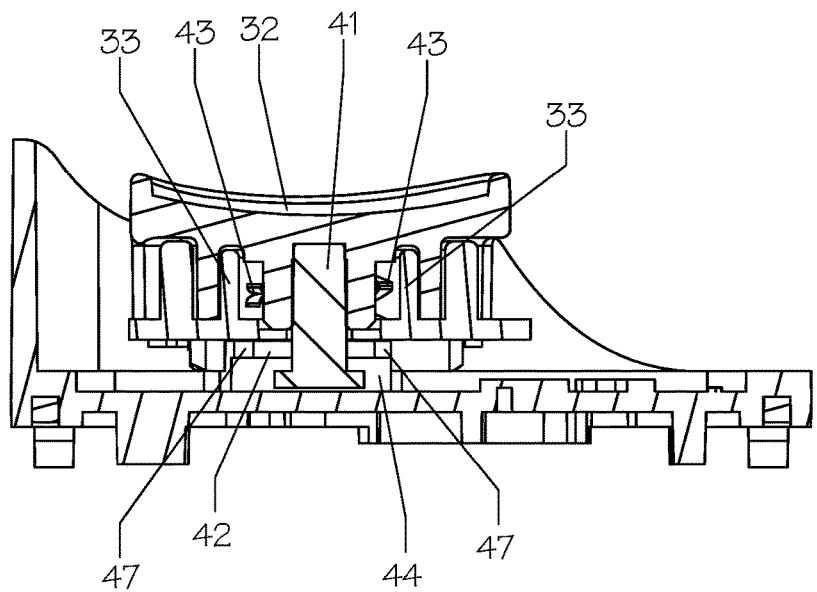
Figure 5C:
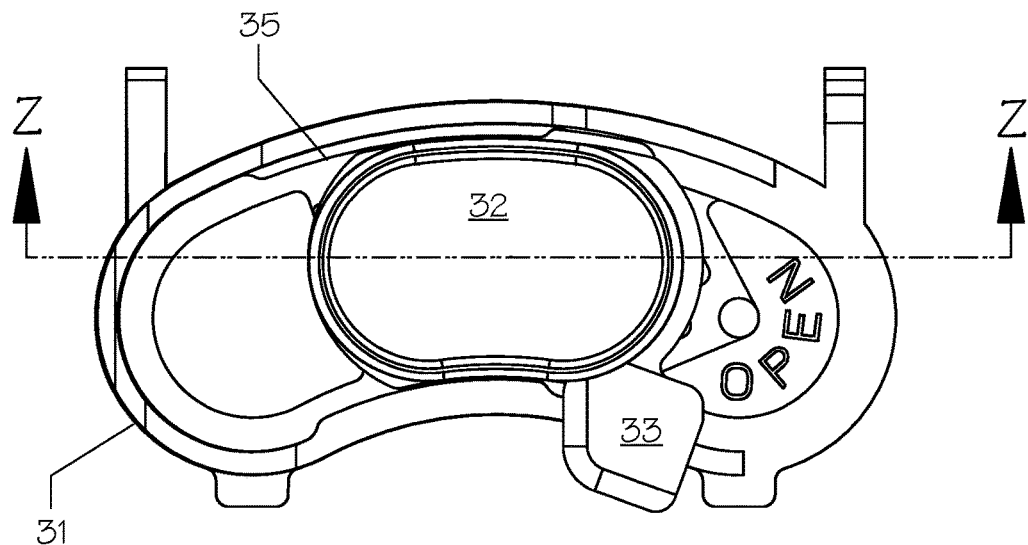
Figure 6C:
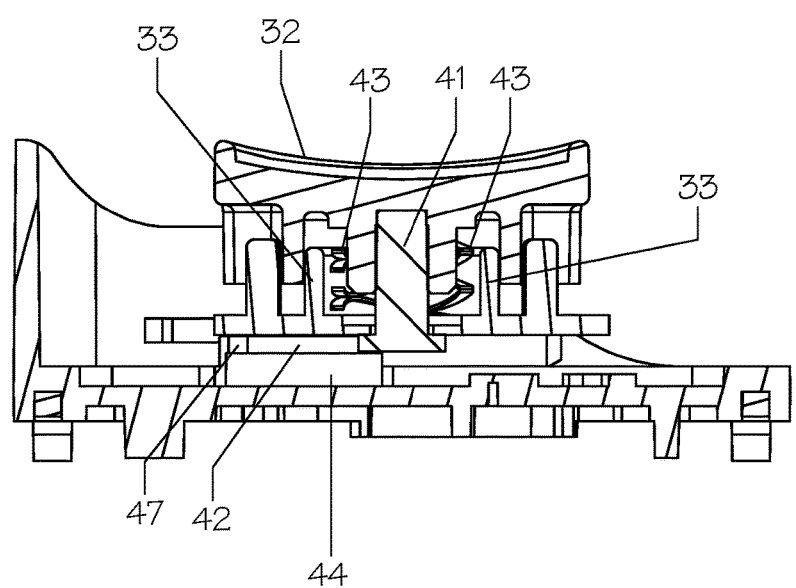

FIGS. 5A-5C are top views of battery door assembly 30 having spring-loaded button 32 placed at various locations on battery cover 31, and FIGS. 6A-6C are cross-section views of battery door assembly 30 from FIGS. 5A-5C, respectively. FIGS. 5A and 6A show battery cover 31 being in a closed position, and spring-loaded button 32 being in an "unpressed" state (i.e., not depressed), with the head of insert 41 engaged in a circular feature 47 at the end of a blocking shelf 42. In this "unpressed" state, spring 43 is uncompressed, insert 41 along with spring-loaded button 32 and locking tab 33 are prevented from moving along glide track 35 by blocking shelf 42.

FIGS. 5B and 6B show that spring-loaded button 32 has been depressed, which compresses spring 43, and the head of insert 41 moves below blocking shelf 42 and into a channel 44. After the head of insert 41 has been placed in channel 44, insert 41 along with spring-loaded button 32 and locking tab 33 are allowed to freely slide along glide track 35 towards an unlock position. At this point, battery cover 31 falls between the locked position and unlocked position.

FIGS. 5C and 6C show that battery cover 31 in the unlock position, with insert 41 being engaged with a circular feature 47 on the opposite side of blocking shelf 42 shown in FIG. 6A. Spring-loaded button 32 is not pressed in FIG. 6C, and thus spring 43 is uncompressed. At this point, battery cover 31 can be flipped opened. After batteries have been inserted or replaced, spring-loaded button 32 can be depressed, allowing insert 41 along with spring-loaded button 32 and locking tab 33 to be slid back to the locked position, as shown in FIGS. 5A and 6A, where insert 41 will engage its locking feature.

Channel 44 is open on both ends, which allows any dirt or debris that may be trapped in channel 44 to be pushed out of the way by the head of insert 41 when spring-loaded button 31 is depressed and slid along glide track 35. In essence, the openings serve as a self-cleaning mechanism for channel 44.

As has been described, the present disclosure provides an improved battery door assembly for a battery compartment within a night vision scope.

While the invention has been particularly shown and described with reference to a preferred embodiment, it will be understood by those skilled in the art that various changes in form and detail may be made therein without departing from the spirit and scope of the invention.

What is claimed is:

1. A battery door assembly comprising:
   a battery cover;
   a curved glide track wherein said curved glide track is made up of an inside vertical surface of said battery cover;
   a spring-loaded button configured to be slid along said curved glide track;
   a locking tab for preventing said battery cover from being flipped open; and
   one or more hinges pivotally connecting said battery cover to a battery compartment, wherein said battery cover is configured to be unlocked by applying pressure on said spring-loaded button wherein said applied pressure is orthogonal to the curved glide track, and then sliding said spring-loaded button and said locking tab from a first end of said curved glide track to a second end of said curved glide track while maintaining said applied pressure on said spring-loaded button.

2. The battery door assembly of claim 1, wherein said locking tab includes latch feet that engage said curved glide track.

3. The battery door assembly of claim 1, wherein said curved glide track is approximately 20° radian.

4. The battery door assembly of claim 1, wherein said applied pressure on said spring-loaded button is approximately 4 pounds.

5. The battery door assembly of claim 1, wherein said battery door assembly is integrated within a night vision device.

6. The battery door assembly of claim 1, wherein said spring-loaded button is slidably connected to said locking tab via a wave spring.

7. The battery door assembly of claim 1, wherein said spring-loaded button is connected to a T-shaped insert.

8. The battery door assembly of claim 7, wherein said T-shaped insert is located in a blocking shelf when said spring-loaded button is located in said first end of said glide track.

9. The battery door assembly of claim 7, wherein said T-shaped insert is located in a blocking shelf when said spring-loaded button is located in said second end of said glide track.

10. The battery door assembly of claim 7, wherein said T-shaped insert is located in a channel when said spring-loaded button is located between said first and second ends of said glide track.

11. A night vision device comprising:
    an optical module comprising a lens; and
    a control module comprising a battery compartment and a battery door assembly, wherein said battery door assembly comprises
    a battery cover;

a curved glide track wherein said curved glide track is made up of an inside vertical surface of said battery cover;

a spring-loaded button configured to be slid along said curved glide track;

a locking tab for preventing said battery cover from being flipped open; and one or more hinges pivotally connecting said battery cover to said battery compartment, wherein said battery cover is configured to be unlocked by applying pressure on said spring-loaded button wherein said applied pressure is orthogonal to the curved glide track, and then sliding said spring-loaded button and said locking tab from a first end of said curved glide track to a second end of said curved glide track while maintaining said applied pressure on said spring-loaded button.

12. The night vision device of claim 11, wherein said curved glide track is approximately 20° radian.

13. The night vision device of claim 11, wherein said applied pressure on said spring-loaded button is approximately 4 pounds.

14. The night vision device of claim 11, wherein said locking tab comprises one or more latch feet that engage said curved glide track.

15. The night vision device of claim 11, wherein said spring-loaded button is slidably connected to said locking tab via a wave spring.

16. The night vision device of claim 11, wherein said spring-loaded button is connected to a T-shaped insert.

17. The night vision device of claim 16, wherein said T-shaped insert is located in a blocking shelf when said spring-loaded button is located in said first end of said glide track.

18. The night vision device of claim 16, wherein said T-shaped insert is located in a blocking shelf when said spring-loaded button is located in said second end of said glide track.

19. The night vision device of claim 16, wherein said T-shaped insert is located in a channel when said spring-loaded button is located between said first and second ends of said glide track.

* * * * *